Oct. 11, 1938.    R. H. MONEY    2,132,796
CASING CONSTRUCTION
Filed Feb. 13, 1936
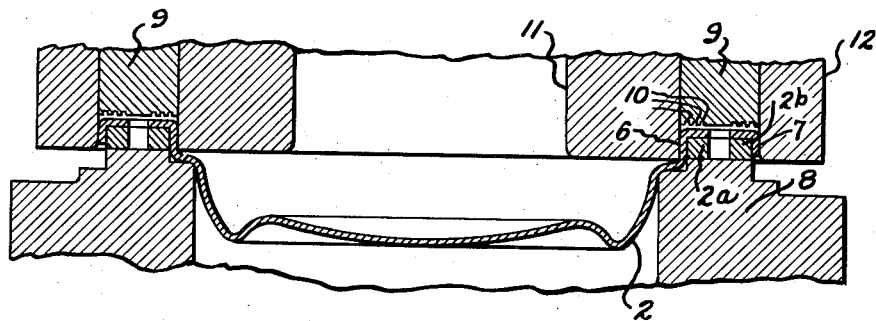
FIG.1.
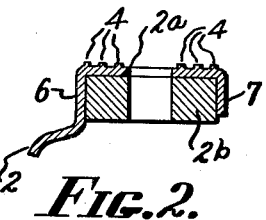
FIG.2.
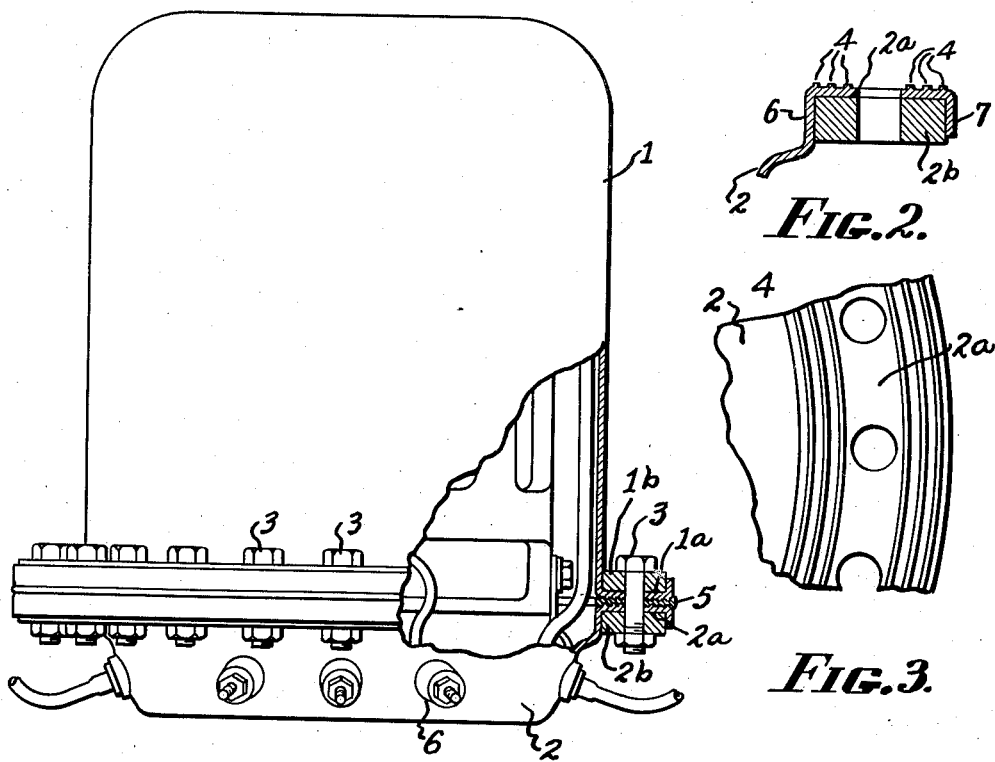
FIG.3.
FIG.4.
INVENTOR.
ROLAND H. MONEY
BY
Allen & Allen
ATTORNEYS.

Patented Oct. 11, 1938

2,132,796

UNITED STATES PATENT OFFICE 2,132,796

CASING CONSTRUCTION

Roland H. Money, Cincinnati, Ohio, assignor to The Crosley Radio Corporation, Cincinnati, Ohio, a corporation of Ohio Application February 13, 1936, Serial No. 63,765

7 Claims. (Cl. 29—148.2)

My invention relates to the construction of sealed casings of the type used to house self contained apparatus such as refrigeration motors and compressors, electrically or pressure operated devices, or other apparatus which must be housed in a casing which is sealed from the atmosphere. My invention has been illustrated in connection with a dome, so-called, within which is housed the motor and compressor of a domestic refrigerator, the said dome being internally subjected either to the high pressure or low pressure side of the refrigerant cycle.

In such constructions and generally in casings for withstanding internal or external pressure, or the like, it is customary to employ metal castings which are flanged and bolted together with an intervening gasket between machined faces.

It is the object of my invention to provide for metal stampings instead of castings and the mode of construction and structure adopted by me is adapted to that end. Incident also to my construction is an arrangement whereby machining of the meeting flanges of the mating shells is avoided.

I accomplish my object by that construction and method of accomplishing it of which an example will be described, the novelty inherent in which will be set forth in the claims that follow.

In the drawing:—

Figure 1 is a view showing in section a die for use in a press, together with a shell section, to illustrate my method of procedure.

Fig. 2 is a detail section of a flanged portion of a shell.

Fig. 3 is a detail plan view of the flange showing the gasket cooperating ridges.

Fig. 4 is a side elevation partly in section of a completed shell.

It will be understood that the particular casing illustrated is but one use to which my invention may be placed. The features of the construction are two metal stampings 1 and 2, constituting two shells which are to be bolted together with an intervening gasket. Each of the shells is turned outwardly to form a flange, 1a and 2a, respectively, and press fitted into each flange, which is channel shaped, is a ring 1b and 2b, respectively, preferably of relatively heavy steel.

The rings and the flanges of the shells are provided with bolt holes for the passage of bolts 3. Also the metal of each flange is formed with tiny ridges 4, which preferably are circular and concentric of the flanges.

When the shells are put together a gasket 5 is inserted between the flanges, and the two shell parts may thus be bolted into a pressure-tight casing. In the example shown, the lead-in fittings as at 6 are set into the lower shell.

In this construction there is no machining of surfaces of the meeting flanges, both because the flanges are in exact correspondence with the steel rings, and because any change in equalities are obviated by the presence of the ridges in the meeting surfaces. Such ridges would hardly be practical in a metal casting without expensive machining and result in a very tight gasket fit.

There is plenty of strength in the shell to withstand the bolting of the flanges together and still the casing as a whole is light in weight and its external surface has a finish which cannot be obtained on cast metal casings.

In forming the shells they will be drawn in dies as is usual in forming shells out of sheet metal, and the flanges will be formed by a press operation.

The rings may be added to the flanges in the operation of forming the inner walls 6, and the outer walls 7 of the said flanges, or by a subsequent press operation.

The operation of forming the ridges may be a part of the operation of pressing the flanges about the rings, or as a final operation after the rings are in place. I have illustrated the latter as a mode of operation.

Thus the shell 2 is shown as located in a die part 8, with the ring 2a resting on the die part. The coacting die part 9 is formed in the shape of the ring and has a series of concentric rings or grooves 10 formed therein.

When the two dies are brought together with great pressure, the little ridges 4 are formed on the surface of the shell flange and the flange is forced to the shape of an absolutely level seat.

The forming of the holes in the shell flanges can be done after the rings are in place, the holes in the rings forming the guide for forming the holes in the flanges by a punching operation.

An important aspect of the operation in forming the completed shell is that the ridges be formed in the flanges while the rings are in place, either during the operation of press fitting the rings to the flanges, or subsequently. As I have shown the operation, the shell is formed with its flanges to loosely fit the ring. The ring is placed on the lower die with the shell over it. The upper die, formed of the ring 9, with an outer ring 12 projecting beyond it, and a central independently operated ring 11, are brought down on the assembly. As a result, the shell flange is press fitted over the ring by the same operation as the ridges are formed on the flange. Also the very heavy procedure employed serves to make an absolutely level seat for the shell, even causing the heavy steel ring to flow, thereby eliminating any irregularities in its thickness.

Having thus described my invention, what I claim as new and desire to secure by Letter Patent, is:—

1. A casing comprising pressed metal shells having out-turned, matching flanges adapted to come together in face-to-face contact for fastening the shells together, said flanges being formed on their faces opposite the meeting faces so as to present channels, heavy metal rings located in said channels, said rings and flanges being perforated to accept bolts for fastening said metal shells together so that said bolts may pass through both of said rings and both of said flanges.

2. A casing comprising pressed metal shells having out-turned, matching flanges adapted to come together in face-to-face contact for fastening the shells together, said flanges being formed on their faces opposite the meeting faces so as to present channels, heavy metal rings located in said channels, said rings and flanges being perforated to accept bolts for fastening said metal shells together so that said bolts may pass through both of said rings and both of said flanges, and the meeting faces of said flanges being roughened to enhance a gasket sealing.

3. A casing comprising pressed metal shells having out-turned, matching flanges adapted to come together in face-to-face contact for fastening the shells together, said flanges being formed on their faces opposite the meeting faces so as to present channels, heavy metal rings located in said channels, said rings and flanges being perforated to accept bolts for fastening said metal shells together so that said bolts may pass through both of said rings and both of said flanges, and the meeting faces of said flanges being roughtened to enhance a gasket sealing, the roughening being in the form of ridges formed concentrically of the flange, and on either side of said perforations, said ridges being formed by upsetting the metal of the flanges.

4. A method of making casing shells which comprises the steps of forming a metal shell with a flange having a face adapted to come into face-to-face contact with a similar face on another shell, locating a heavy metal stiffening ring against the opposite face of said flange, and turning over against said ring an edge of said flange so that said ring is set in a channel shaped configuration of the metal of said shell, in which it has a press fit, and then while said ring is in place on said flange, engaging the first mentioned face of said flange with a grooved die and pressing said flange and ring together under heavy pressure so as to conform said flange to said ring and form in said flange face small grooves and ridges adapted to enhance a gasket sealing, and perforating concurrently said flange and said ring.

5. A method of making casing shells which comprises the steps of press forming a metal shell with a flange having a face adapted to come into face-to-face contact with a similar flange on another shell, locating a heavy metal stiffening ring against the opposite face of said flange and edgewise against a body portion of said shell, turning over a portion of said flange against the outer edge of said ring, so as to locate said ring essentially in a channel, and subjecting the said flange and said ring together to heavy pressure so as to conform said flange to said ring, and to give said ring a tight fit in said channel, and concurrently perforating said ring and said flange.

6. A method of making casing shells which comprises the steps of press forming a metal shell with a flange having a face portion adapted to come into face-to-face contact with a similar face portion of a flange on another shell, and assembling with said structure a heavy metal stiffening ring in such a way that said ring is located on the opposite face of said flange and essentially in a channel formed in the metal parts, and subjecting said flange and ring together to heavy pressure so as to conform said flange to said ring, and give said ring a tight fit in said channel, and concurrently perforating said ring and said channel.

7. A casing shell for a refrigerator construction comprising pressed metal shells having out-turned flanges with faces adapted to come into face-to-face contact, each flange as to its opposite face having a channel shaped configuration and heavy metal rings press fitted in said channels to provide stiffness when said flanges are juxtaposed and the flanges and rings are held together as by bolts, said flanges and rings being concurrently perforated to accept said bolts, said rings lying on the outside of such joint and the meeting faces of said flanges therebetween.

ROLAND H. MONEY.